Oct. 13, 1964     E. W. FRIES     3,152,560
METHOD AND APPARATUS FOR FORMING FRIED
RING-SHAPED COMESTIBLES
Filed June 13, 1961
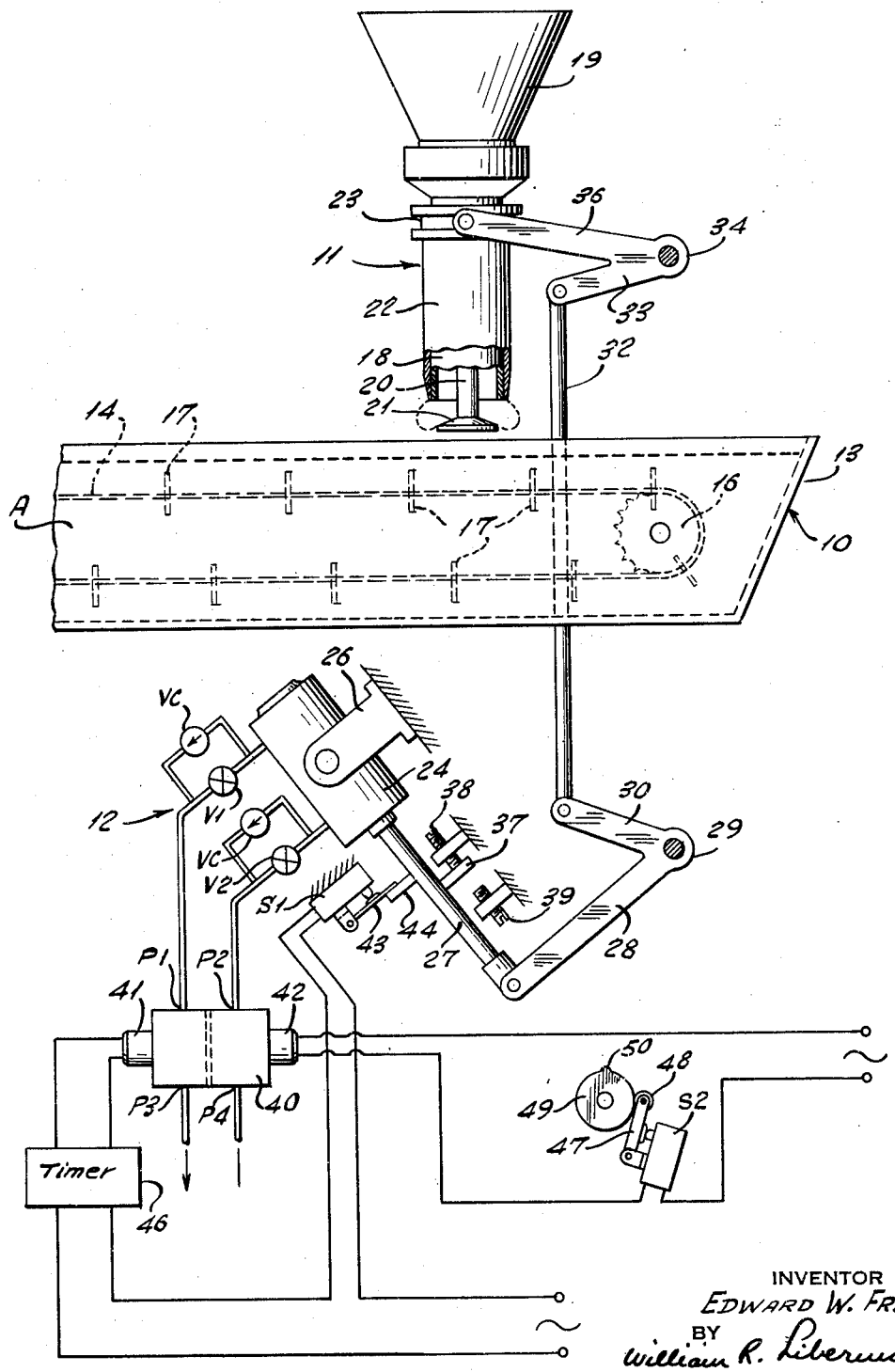
INVENTOR
EDWARD W. FRIES
BY
William R. Liberman
ATTORNEY

United States Patent Office 3,152,560
Patented Oct. 13, 1964

3,152,560
METHOD AND APPARATUS FOR FORMING
FRIED RING-SHAPED COMESTIBLES
Edward W. Fries, Baltimore, Md., assignor to DCA Food
Industries Inc., New York, N.Y., a corporation of New
York
Filed June 13, 1961, Ser. No. 116,765
13 Claims. (Cl. 107—14)

The present invention relates generally to improvements in methods and apparatus for the production of comestibles. In particular it relates to an improved method and apparatus for the production of deep fried ring-shaped doughnuts.

The conventional ring doughnut of the type to which the present invention relates is produced from a dough containing a chemical leavening which evolves an expanding gas upon being raised above a predetermined temperature. The chemical leavening is relatively dormant at about room temperature but is activated to the desired rate of gas evolution when immersed in hot frying oil which is at a temperature of about 375° F. The common method of forming the ring doughnut in its well known torus configuration is by employing an extrusion die which includes a vertically arranged tubular nozzle provided with a valve disc coaxial with and disposed below the bottom discharge opening of the nozzle. A cutter sleeve having a sharp bottom knife edge slidably engages the nozzle and is movable between a depressed positon in closing registry with the valve disc and a raised open position spaced from the disc. The cutter sleeve reciprocates periodically between its depressed and raised positions in a fixed predetermined stroke. The nozzle is connected to a source of dough under pressure and disposed directly above the feed end of a deep frier unit. As the cutter sleeve is raised to expose the annular die opening, the dough is extruded in the shape of a torus and upon return of the cutter sleeve to its depressed position, the die opening is closed; the shaped dough piece is severed from the nozzle and drops into the hot oil.

While the above apparatus and procedure for shaping and producing ring doughnuts is widely employed it possesses numerous drawbacks and disadvantages. It is highly inflexible, requires very close process control and frequently produces an unsatisfactory product and one which is lacking in uniformity. The resulting doughnut is often of high bulk density and of inferior palatibility and is frequently of highly unattractive appearance and hence of poor marketability. In addition, the dough employed must possess the proper viscosity and other physical characteristics within very close limits of variation or else the resulting doughnut is inferior and not salable as a first quality product. Since it is difficult, if not impossible to modify the dough once it has been produced, the consequences are undesirable waste and inefficiency.

It is thus a principal object of the present invention to provide an improved method and apparatus for the production of comestibles.

Another object of the present invention is to provide an improved method and apparatus for the production of fried ring cake doughnuts.

Still another object of the present invention is to provide an improved method and apparatus for the shaping of ring doughnuts formed of dough containing a temperature-responsive chemical leavening which is activated by the deep frying of the doughnuts.

A further object of the present invention is to provide an improved method and apparatus for the production of ring doughnuts wherein a dough having a wide range of physical properties may be employed.

Still a further object of the present invention is to provide an improved method and apparatus for producing fried doughnuts in which the end product is of uniformly high quality and attractive appearance.

Another object of the present invention is to provide an improved method and apparatus of the above nature characterized by its simplicity, versatility, flexibility and dependability.

The above and further objects of the present invention will become apparent from a reading of the following description taken in conjunction with the accompanying drawing which is a fragmentary elevational and diagrammatic view of a form of the improved apparatus with which the present improved process may be practiced.

Among the properties which affect the quality of a fried ring doughnut are its volume, texture, shape and surface characteristics. The volume and texture are closely interrelated, maximum volume being generally accompanied by optimum texture and eating quality and also representing a maximum yield from the dough. The volume and shape of the doughnut are also closely related in that when the volume is relatively high the doughnut appearance is attractive and when the volume is low the appearance is poor.

It has been observed that when the freshly shaped raw doughnut drops from the extruder into the hot oil, it submerges in the oil and remains substantially submerged for a period of about 3 to 4 seconds. Consequent to the heating of the doughnut by the hot oil, the leavening is activated to evolve a gas which expands the doughnut thereby to increase its buoyancy and cause it to float. In addition, the hot oil promotes the sealing of the surface of the doughnut to contain the expanding evolved gasses therein sufficiently to effect the further expansion of the doughnut. The better the surface sealing, the greater is the expansion. However, a point is reached during the expansion process at which the gas containing skin is ruptured and some of the gas is released. It has been observed that optimum results are achieved when the skin ruptures between about 8 and 12 seconds following the deposit of the doughnut into the hot oil. The time of rupture after deposition of the doughnut into the hot oil will be designated hereinafter as the break time. The position of the skin rupture on the surface of the doughnut will be designated as the break line.

The break line is generally in the form of a regular or irregular circular line concentrically located in the surface of the floating doughnut above the level of the oil. The position at which the break line forms is highly indicative and greatly influences the quality of the end product. When the break line forms along the inner surface of the doughnut, that is within the hole of the doughnut, and directly above the level of the oil, a doughnut of optimum quality is achieved. It is believed that the reason for the above is that the doughnut surface skin recedes towards and into the doughnut hole, reducing the size of the hole and leaving the remainder of the surface substantially intact, the result of which is further to contain the still expanding gasses and thereby provide an increasing volume of the doughnut. An indication of doughnut quality is a relatively small outside diameter, maximum thickness, a small hole and the presence of a "star" formation of uniform appearance. It should be noted that the star formation is defined by a substantially regularly serrated appearance of the doughnut skin at the inner hole surface, caused by the lower semi-congealed skin at the break line receding into the smaller diameter of the hole and wrinkling as a result of compression.

When the break line is substantially removed from the optimum position set forth above, such as along the top or toward the outside of the doughnut, an inferior product results. The escape of gas from the doughnut is excessive, thereby adversely effecting the volume and texture thereof. In addition, the surface skin movement, rather than in the direction of the center hole, is towards the outside of the doughnut increasing both the diameter of the hole and the outside diameter, this resulting in no star formation at all or at best a star formation of non-uniform and unattractive appearance.

It is thought that the skin of the doughnut will burst at the weakest point. The doughnut skin is primarily formed by the dough being forced by pressure over the sharp edge of the knife during extrusion. The weak point is formed at the instant of the final separation of the dough ring from the extruder. When this separation occurs, extruding action has stopped and the dough ring, separated by gravity, retains a circular line which has not been treated by rubbing over the sharp knife edge. This weak line or break point arrives at a final position on the doughnut as a result of the action of the dough as it is being extruded and is affected by, either or, a combination of knife action, area of aperture, and dough viscosity.

It has been discovered that the break time and the position of the break line can be varied and closely controlled by adjusting the parameters of the stroke of the cutter sleeve of the doughnut extruder and shaping mechanism. Among the stroke parameters which may be adjusted to effect a variation in the break time and break line position are the length of the stroke, the rise time, the open or dwell time and the fall time. By adjusting one or more of the above stroke operating parameters, the break line may be brought to its optimum position and the break time to its optimum point. It has been found also that the subject procedure may be employed with doughs of varying viscosities and other physical properties. Thus, where batches of dough had to be discarded when conventional practice was followed, employment of the above procedure permits the use of doughs of widely varying properties to produce a doughnut of high quality.

Thus, in a sense, the present invention contemplates the improved method of producing a shaped doughnut comprising extruding dough through a nozzle having a downwardly directed opening and a disc disposed below and in axial alignment with said opening, periodically reciprocating a cutter sleeve registering with said nozzle along a stroke between a closed position in engagement with said closure member and an open position above said closure member to define therewith an annular extrusion opening, to form in succession substantially torus shaped pieces of dough, dropping said pieces of dough into hot oil whereby to form a skin on said zone which ruptures along a break line and adjusting a parameter of said cutter sleeve stroke to shift said break line to a predetermined position on said doughnuts.

The apparatus contemplated by the present invention and with which the subject process may be practiced includes a vertical cylindrical nozzle connected to a dough hopper, a disc shaped member supported below and in axial alignment with the bottom of said nozzle, a cutter sleeve registering with said nozzle and slidable downwardly to a closed position engaging said closure member and to a raised open position out of engagement with said closure member, means reciprocating said cutter sleeve along a predetermined stroke between said opened and closed positions, and means for adjusting at least one parameter of said stroke independent of the frequency thereof. According to a preferred form of the present invention, the cutter sleeve is actuated by a fluid motivated cylinder the length of whose stroke is adjustable thereby to vary the stroke of the cutter sleeve. A fluid under pressure is fed to opposite sides of the actuating cylinder by way of adjustable valves in order to control the feed rate of the fluid into the cylinder and hence the time of the advance and retraction cycles of the stroke and the raising and lowering of the cutter sleeve. Solenoid-actuated valve means alternatively connect opposite sides of the cylinder to the pressure fluid actuated in synchronism with the frier mechanism to connect the sleeve raising end of the cylinder to the pressure fluid, and upon the cutter sleeve being raised adjustable time delay means are triggered to connect the sleeve lowering end of the cylinder to the pressure fluid to effect the lowering of the cutter sleeve in a controllable predetermined interval following the raising thereof. Thus, the adjustable parameters of the cutter sleeve stroke are the length thereof, the rise time, the dwell time when in raised position, and the fall time, and these may be effected under machine operating conditions until the desired results are achieved.

Referring now to the drawing which illustrates a preferred embodiment of the apparatus of the present invention whereby the improved process of the invention may be practiced, reference numeral 10 generally designates a continuous deep frier unit of conventional construction, over the feed end of which is located a dough extruding and doughnut forming unit 11 motivated by an adjustable control mechanism indicated generally at 12. Frier unit 10 includes a longitudinally extending trough 13 containing a heated frying oil A. A pair of transversely-spaced endless sprocket chains 14 are disposed in trough 13 and extend the length thereof, and are advanced by a pair of sprocket wheels 16 driven by a suitable drive motor through a variable speed reducing unit (not shown). Supported by and between sprocket chains 14 are a plurality of regularly longitudinally spaced transversely-extending flights 17, the spaces between successive flights defining advancing frying compartments for the comestibles under treatment.

The doughnut forming unit 11 includes a vertical cylindrical nozzle 18 depending from and communicating with a conventional hopper or reservoir 19 containing dough under a predetermined pressure. The bottom opening of nozzle 18 is directed downwardly toward the trailing end of trough 13. A coaxial stem 20 is supported by, and projects below nozzle 18, and carries at its lower end an aligned closure-defining disc 21 having a diameter about that of the outer diameter of nozzle 18. A cutter sleeve 22 snugly and slidably registers with nozzle 18, and is provided at its lower end with a sharp cutting edge, and at its upper edge with a peripherally grooved collar 23. Cutter sleeve 22 is movable to a depressed closed position in engagement with closure disc 21 which snugly nests in the lower end of the sleeve 22, and to a raised position to provide an annular opening delineated by the edge of the disc 21 and the lower edge of sleeve 22, the dough being extruded as a torus through said annular opening and severed by the depression of the sleeve 22 whereupon it is deposited or drops into an advancing frying compartment between a pair of flights 17, 17.

Cutter sleeve 22 is periodically reciprocated by a pneumatic cylinder 24 rockably supported by a suitably mounted bracket 26 and provided with a piston connected by a piston rod 27 to the free end of a lower arm 28 of a bell crank 29 rockably supported at its knee section. The upper arm 30 of bell crank 29 is in turn connected by a rod 32 to the lower arm 33 of a rockable bell crank 34, the upper arm 36 of which terminates in a yoke which engages the grooved collar 23 at the upper end of cutter sleeve 22. Thus, the piston advance of rod 27 lowers cutter sleeve 22 by way of bell cranks 29 and 34 while the retraction of piston rod 27 raises cutter sleeve 22.

The length of the stroke of cutter sleeve 22 and hence the size of the extrusion opening is adjustable by an arrangement including a detent bar 37 affixed to piston rod 27. A pair of stationary adjustable stop members are disposed on longitudinally opposite sides of the detent bar 37. The stop members include brackets provided with longitudinally tapped bores engaging screw members 38 and 39 longitudinally aligned with, and on opposite sides of, detent bar 37. Screw 39 is adjusted so that in its lowermost position the lower edge of the sleeve just engages the closure disc 21, and screw 38 is adjusted to control the uppermost position of the cutter sleeve stroke and hence the width of the annular extrusion opening.

A four-way valve 40, selectively switched by associated solenoids 41 and 42, is provided with ports P1, P2, P3 and P4, energization of solenoid 42 connecting port P2 to port P4 and port P1 to port P3, and energization of solenoid 41 connecting port P1 to port P4 and port P2 to port P3. Valve port P1 is connected by way of an adjustable needle valve V1 to the rear section of cylinder 24 and port P2 is connected by way of an adjustable needle valve V2 to the forward section of cylinder 24. Each of valves V1 and V2 is bypassed by a spring biased check valve VC which permits fluid flow therethrough only in a direction out of cylinder 24, upon a sufficient pressure differential. Port P3 is connected to the atmosphere and port P4 is connected to a source of compressed air.

A normally open switch S1 includes an actuating arm 43 which is disposed in the path of a detent bar 44 affixed to piston rod 27 and urged thereby to a switch "close" position when the piston rod 27 is in its retracted position. Valve solenoid 41 is connected by way of an adjustable time delay relay or timer 46 in series with the switch S1 to a source of current. Thus, upon the retraction of piston rod 27, switch S1 is closed and solenoid 41 energized an adjustable predetermined time thereafter to switch port P1 to port P4 and advance piston rod 27. Valve solenoid 42 is connected by way of a normally open switch S2 to a source of current. Switch S2 is provided with a pivoted actuating arm 47 carrying a cam follower 48 which engages a cam 49. Said cam 49 is rotated in synchronism with the advance of the frier flights 17, rotating a single revolution for the increment advance of the flights 17, a distance separating successive flights. The raised portion 50 of the cam 49 registers with the follower 48 when a frier compartment delineated by a pair of successive flights is in alignment with the extruder nozzle 18, to close switch S2 thereby to energize valve solenoid 42.

Considering the operation of the apparatus described above, when a flight-delineated frying compartment is in alignment with extrusion nozzle 18, the cam raised portion 50 engages follower 48 to momentarily close the switch S2 and energize solenoid 42. Energized solenoid 42 switches valve 40 to connect port P2 to the source of compressed air and port P1 to the atmosphere, the compressed air entering the forward end of the cylinder 24 by way of the needle valve V2 thereby to retract piston rod 27, the air in the rear end of cylinder 24 being released to the atmosphere by way of check valve VC and port P3 in valve 40. The retraction of rod 27 raises the cutter sleeve 22 to its open position as adjusted by screw 38. The dough is extruded downwardly and outwardly through the annular opening formed by raised cutter sleeve 22. With the retraction of piston rod 27, switch S1 is closed by detent bar 44 to energize solenoid 41, a predetermined period thereafter, and thereby switch valve 40 to connect the rear of the cylinder 24 to the compressed air from port P4 and the leading section thereof, to the atmosphere by way of the check valve VC and port P3 in valve 40. Piston rod 27 is thus advanced to draw cutter sleeve 22 downwardly, closing the extrusion opening and severing a torus shaped piece of dough which thereupon drops into a registering fryer compartment. The above cycle is periodically repeated in synchronism with the advance of frier flights 17. The length of the cutter sleeve stroke and hence the size of the dough extrusion opening may be varied by adjusting the stop screw 38, the rise time of the cutter sleeve may be varied by adjusting the needle valve V2, the fall time thereof may be varied by adjusting the needle valve V1 and the dwell time at the top of the sleeve stroke may be varied by adjusting timer 46.

In practicing the present improved process with the apparatus described hereinabove, the apparatus is first set into operation under average conditions in the manner earlier described and the doughnuts are observed as they are advanced along the frier. In the event that the break line is in its optimum position, the apparatus is permitted to run as originally adjusted. However, if the quality of the doughnut is unsatisfactory, as indicated by the position of the break line or the break time, one or more of the cutter sleeve parameters are adjusted advantageously, while the apparatus is running, to shift the break line and break time to their optimum positions. It should be noted that the break line and break time are closely related, a satisfactory break line generally being achieved at a break time below about 12 seconds and preferably between about 8 and 12 seconds. The break line is preferably along the inner surface of the doughnut just above the oil level. The amount of dough forming the doughnut is varied by the pressure on the dough, the length of the cutter stroke and the dwell time. While the position of the break line can be varied by adjusting any of the stroke parameters as aforesaid, it has been found that the position of the break line is advantageously varied by adjusting the cutter sleeve rise and fall times. The range of the cutter sleeve rise time, as well as the cutter sleeve fall time, is advantageously between .01 and 1.7 seconds and the range of the dwell time is advantageously between 0 and 0.4 second. Further, the length of the stroke of the cutter sleeve above its closed position is advantageously between about ¼" and ⅝".

As an example of the above process, doughnuts were produced from the same dough with a dough forming mechanism in which the inside diameter of the cutter sleeve 22 and the diameter of the closure disc 21 were about 1.75" and the stroke of the cutter sleeve 22 was about .5". The dwell time of the cutter sleeve was set at 0.4 second by adjusting timer 46, and the rise and fall times were adjusted in increments to equal values of .01, 0.20 and 1.70 seconds. The break times and break line positions were unsatisfactory at rise and fall times of .01 and 1.70 seconds, and the resulting doughnut was of poor quality, where as at the rise and fall times of 0.20 second the break time and break line positions were optimized, as aforesaid, and the doughnut quality was excellent. The dwell time was then adjusted to 0.1 second and doughnuts produced at the above rise and fall times. Here again, optimum results and excellent quality doughnuts were achieved at rise and fall times of 0.20 second, whereas poor quality doughnuts and poor break times and break line positions were effected with the rise and fall times of .01 and 1.7 seconds. As has been set forth earlier, the optimum parameters will vary with the properties of the dough, thereby permitting a much wider range of control in the production of the dough.

While there has been described and illustrated preferred embodiments of the present invention, it is apparent that numerous alterations, omissions and additions may be made without departing from the spirit thereof.

What is claimed is:

1. The method of producing a deep fried ring doughnut wherein a leavening-containing dough is extruded through an annular opening delineated by a closure member and the confronting edge of an aligned sleeve periodically reciprocating relative thereto in a ring forming and cutting cycle including an upstroke from a depressed closed position in engagement with said closure member to a raised open position, a dwell period in said raised position and a downstroke back to said closed position, comprising successively dropping the extruded dough rings into a hot frying oil wherein said dough expands to rupture the surface of said ring along a break line, and varying at least one of the time parameters of said cycle substantially independently of the frequency thereof to effect a shift in the position of said break line along the surface of said doughnut toward the innermost perimeter thereof.

2. The method according to claim 1, wherein the rate of rise of said sleeve during said upstroke is varied to effect said break line change in position.

3. The method according to claim 1, wherein the rate of fall of said sleeve during said downstroke is varied to effect said break line change in position.

4. The method according to claim 1, wherein said dwell period is varied to effect said break line change in position.

5. The method of producing a deep fried ring doughnut wherein a leavening-containing dough is extruded through an annular opening delineated by a closure member and the confronting edge of an aligned sleeve periodically reciprocating relative thereto in a ring forming and cutting cycle including an upstroke from a depressed closed position in engagement with said closure member to a raised open position, a dwell period in said raised position and a downstroke back to said closed position, comprising successively dropping the extruded dough rings into a hot frying oil wherein said dough expands to rupture the surface of said ring a predetermined break time following the dropping of said ring of dough into said oil, and varying at least one of the time parameters of said cycle substantially independently of the frequency thereof to reduce said break time.

6. The method according to claim 5, wherein said break time is below 12 seconds.

7. A dough extruding apparatus comprising a closure member, a sleeve in axial alignment with said closure member, and vertically reciprocatable relative thereto, means connecting said sleeve to a source of dough, means reciprocating said sleeve in a cycle including an upstroke from a depressed closed position in engagement with said closure member to a raised open position, and means for adjusting at least one of the time parameters of said cycle substantially independent of the frequency thereof.

8. An apparatus according to claim 7, wherein said parameter is the rate of rise of said sleeve during said upstroke.

9. An apparatus according to claim 7, wherein said parameter is the rate of fall of said sleeve during said downstroke.

10. An apparatus according to claim 7, wherein said parameter is said dwell period.

11. An improved dough extruding apparatus comprising a closure member, a sleeve in axial alignment with said closure member and vertically movable relative thereto, a hot oil containing trough disposed below said closure member, means defining a plurality of successive frying compartments disposed along the length of said trough, drive means advancing said compartments along said trough, a fluid pressure operated cylinder including a reciprocatable piston rod, means connecting said piston rod to said sleeve to effect the reciprocation of said sleeve relative to said closure member, a four-way valve including first and second outlet ports and first and second inlet ports and provided with first and second switching solenoids, the energization of said first solenoid connecting said first and second outlet ports to said first and second inlet ports respectively and the energization of said second solenoid connecting said first and second outlet ports to said second and first inlet ports respectively, conduits connecting said outlet ports to opposite ends of said cylinder, a flow adjusting valve located in at least one of said conduits, means connecting said second inlet port to a source of fluid under pressure, means including a first normally open switch connecting said first solenoid to a source of current, means periodically closing said first switch in synchronism with said drive means, means including a series connected variable time delay device and a normally open second switch connecting said second solenoid to a source of current, and means closing said second switch upon the raising of said sleeve.

12. An apparatus according to claim 11, wherein each of said conduits is provided with a flow adjusting valve.

13. An apparatus according to claim 11, including adjustable stop means for varying the stroke of said piston rod.

References Cited in the file of this patent

UNITED STATES PATENTS

| | | |
|---|---|---|
| 1,458,197 | Purdy | June 12, 1923 |
| 1,798,582 | Bergner | Mar. 31, 1931 |
| 2,310,463 | Russell | Feb. 9, 1943 |
| 2,313,949 | Lagaard | Mar. 16, 1943 |
| 2,317,897 | Ellis | Apr. 27, 1943 |
| 2,511,826 | Schmitt | June 13, 1950 |
| 2,676,552 | Hunter et al. | Apr. 27, 1954 |